United States Patent [15] 3,674,935

Lawrence [45] July 4, 1972

[54] DIGITAL CIRCUIT DEMODULATOR FOR FREQUENCY-SHIFT DATA SIGNALS

[72] Inventor: Thomas Russell Lawrence, Leonardo, N.J.

[73] Assignee: Bell Telephone Laboratories, Incorporated, Murray Hill, N.J.

[22] Filed: Oct. 7, 1970

[21] Appl. No.: 78,696

[52] U.S. Cl. ....................178/88, 325/320, 325/349, 328/133, 329/110, 331/25

[51] Int. Cl. ....................H04l 27/14

[58] Field of Search ....................325/30, 320, 349; 178/66, 67, 178/88; 328/133, 140, 141; 329/110; 331/25

[56] References Cited

UNITED STATES PATENTS

| | | | |
|---|---|---|---|
| 3,474,341 | 10/1969 | Crafts et al. | 178/66 |
| 3,518,680 | 6/1970 | McAuliffe | 178/88 |
| 3,412,206 | 11/1968 | Bizet et al. | 178/88 |
| 3,271,742 | 9/1966 | Rumble et al. | 178/66 |
| 3,377,560 | 4/1968 | Renshaw | 325/320 |
| 3,564,433 | 2/1971 | Miller | 325/320 |
| 3,568,066 | 3/1971 | Fujimura | 325/320 |

*Primary Examiner*—Benedict V. Safourek
*Assistant Examiner*—Peter M. Pecori
*Attorney*—R. J. Guenther and Kenneth B. Hamlin

[57] ABSTRACT

FSK data signals are applied to a digital phase-locked loop having a countdown feedback circuit producing a signal wave which leads or lags the phase of the data signal by an angle which is dependent on the frequency of the data signal. The countdown circuit also generates a second signal wave which lags the phase of the feedback wave by a fixed angle. The unique permutations of concurrent amplitudes of the three signals are processed by sets of gates to recover the baseband signal. Counters monitor the outputs of the gates to detect steady tone signals and loss of carrier.

10 Claims, 4 Drawing Figures

INVENTOR
T. R. LAWRENCE
BY R C Lipton
ATTORNEY

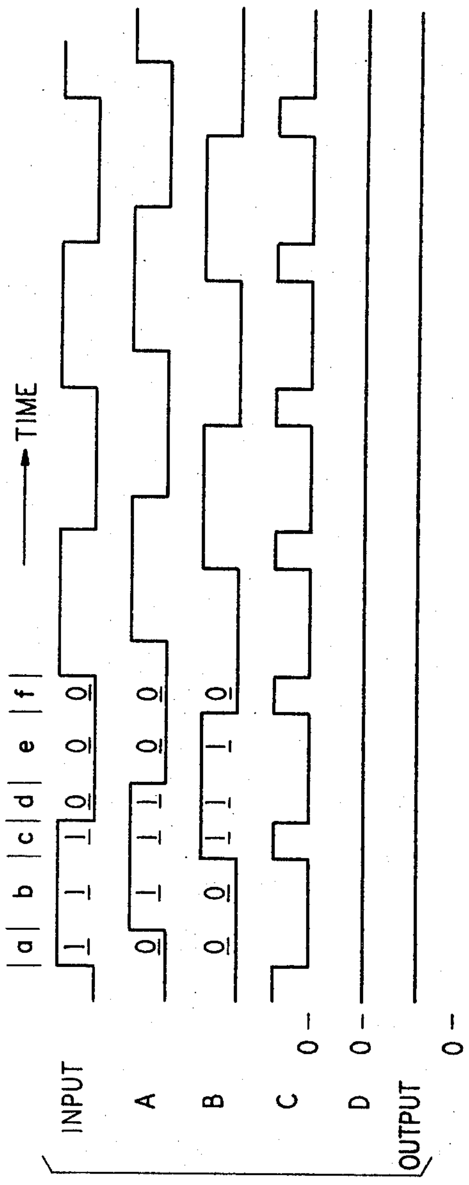
FIG. 3A SPACE
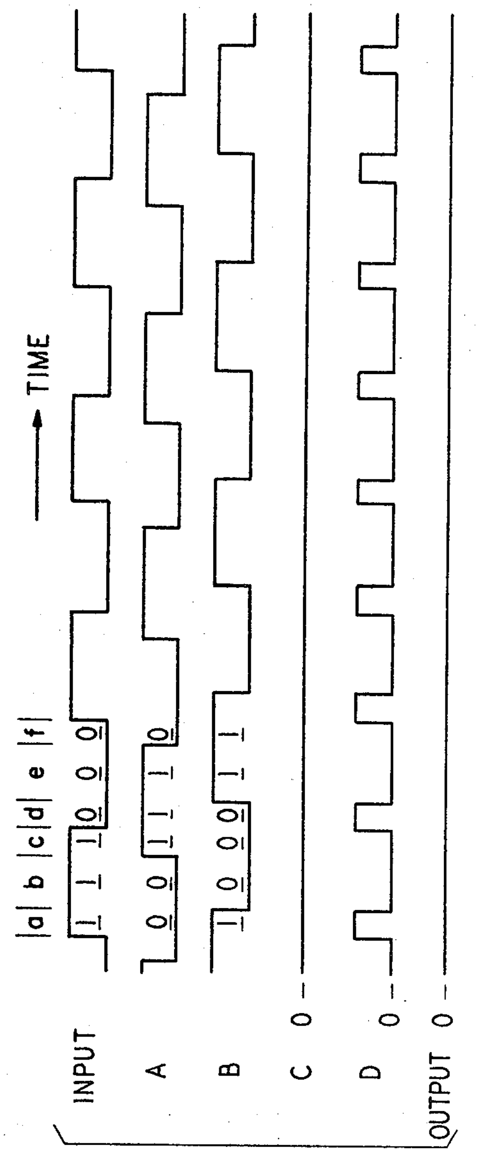
FIG. 3B MARK

DIGITAL CIRCUIT DEMODULATOR FOR FREQUENCY-SHIFT DATA SIGNALS

FIELD OF THE INVENTION

This invention relates to frequency-shift signal receivers and, more particularly, to frequency-shift-keyed (FSK) data signal receiving circuits, such as discriminators and carrier and tone detectors.

DESCRIPTION OF THE PRIOR ART

One of the common forms of data communication is FSK signaling. This type of signaling involves the transmission of a carrier signal, usually in the voiceband range. At the transmitter, the signal is shifted, in frequency, in accordance with the amplitude of the baseband data signal bit or element being transmitted. The data set receiver must therefore include frequency selective circuits for demodulating the FSK signal and recovering the baseband data signal.

It is advantageous, in frequency selective circuits, to employ circuits using digital techniques. The utilization of digital circuits eliminates magnetic components permitting miniaturization through integrated circuitry, minimizing component cost and deterioration. In addition, where digital techniques are employed, a plurality of signal lines can be processed by common digital circuits on a time-shared basis.

Accordingly, it is a broad object of this invention to provide frequency selective circuits in a signal receiver using digital techniques.

It has been shown that FM demodulation can be performed by a phase-locked loop since the loop feedback signal has the same frequency as the incoming wave and leads or lags, in phase, by an angle which is dependent on the frequency of the incoming wave. Accordingly, the baseband signal is recovered by determining the phase difference (or error) of the feedback signal with respect to the incoming signal and by filtering out the high frequency components. In a copending application of G. P. Pasternack and B. R. Saltzberg, Ser. No. 712,741, filed Mar. 13, 1968, there is disclosed a discriminator of this type utilizing digital circuit techniques. The phase-locked loop includes an EXCLUSIVE-OR circuit for comparing the phase of the incoming wave and the output of a digital downcounter. The downcounter, in turn, is driven by pulses whose average rate is determined by the output of the EXCLUSIVE-OR phase comparator. The output of the phase comparator is also applied through a zero-crossing detector to a digital filter to recover the baseband signal. The discriminator is therefore entirely digital in its makeup. Digital filters, however, are relatively complex and often difficult to design and expensive to construct.

It is, therefore, an object of this invention to digitally process FSK signals utilizing relatively simple circuits which are easy to design and inexpensive to construct.

SUMMARY OF THE INVENTION

In the present invention, a first signal wave if produced having the same frequency as an incoming FSK wave and differing in phase by an angle which is dependent on the frequency of the incoming wave. In the specific embodiment shown, this is accomplished by a digital phase-locked loop of the type disclosed in the above-mentioned application of G. P. Pasternack et al. In addition, a digital circuit connected to the phase-locked loop generates a second signal wave which has the same frequency as the first signal wave and differs in phase by a fixed angle such that the second signal wave leads and lags the phase of the FSK wave in accordance with the frequency of the FSK wave. It was discovered that the three waves (the incoming FSK wave and the first and second signal waves) have unique permutations of concurrent amplitudes for each frequency of the incoming wave. A relatively simple digital logic circuit, easy to design and inexpensive to construct, therefore, concurrently processes the three waves to identify the unique permutations and thus recover the baseband signal. In accordance with the specific illustrative embodiment disclosed herein, the digital logic circuit comprises two sets of gates, each gate arranged to detect a specific unique permutation and each set arranged to identify those permutations of a corresponding one of the frequencies of the incoming wave. The outputs of the two sets of gates are then connected to a bistable device which reproduces the binary baseband signal.

It is a feature of this invention that the output pulsing of one of the sets of gates is counted by a timer which is reset by transitions of the baseband signal. The timer therefore determines the duration of steady tone of the incoming FSK wave at the frequency corresponding to the set of gates.

It is a further feature of this invention that transitions of the baseband signal are counted for intervals shorter in duration than a signal element or bit. A plurality of transitions during any interval therefore indicates a loss of the baseband signal and therefore a loss of carrier.

The foregoing and other objects and features of this invention will be more fully understood from the following description of an illustrative embodiment thereof taken in conjunction with the accompanying drawings.

BRIEF DESCRIPTION OF THE DRAWINGS

In the drawing:

FIGS. 3A and 3B disclose the various output wave forms of the several circuits which form the discriminator under the condition that incoming signals are space and mark, respectively.

DETAILED DESCRIPTION

Figure 1:
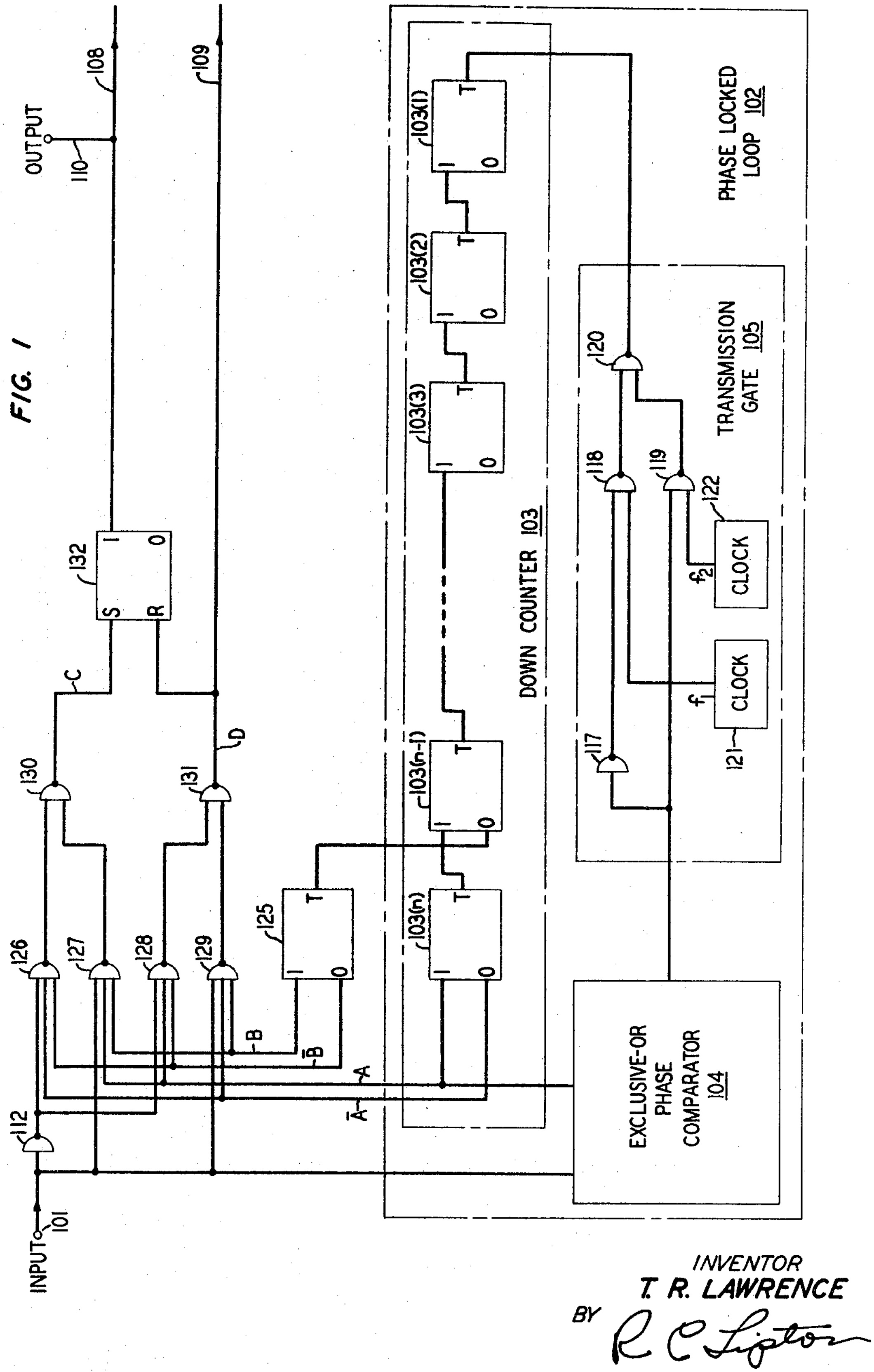
FIG. 1 and FIG. 2, when arranged side by side, show the various circuits which form a frequency discriminator and tone and carrier detector for an FSK signal in accordance with this invention.

In the discriminator shown in FIG. 1, incoming signals are received on input terminal 101. It is to be assumed that the incoming signals comprise frequency-shift signals which are "-hard limited." The hard limiting of the frequency-shift signals produces a square wave. The cross-overs of the square wave correspond to the crossovers of the original frequency-shift signal.

The incoming signal may represent either a marking signal or a spacing signal. The spacing signal is the lower of the two frequencies and is represented by the input wave shown in FIG. 3A. The square wave designating the marking, or higher, frequency is shown as the input wave in FIG. 3B.

The incoming frequency-shift signal is passed to phase-locked loop 102. In addition, the signal is passed to gates 127 and 129 and, in its inverted form by virtue of inverter 112, to gates 126 and 128. Gates 126 through 129 provide the processing of the frequency-shift signal, as described hereinafter.

Phase-locked loop 102 is preferably of the type which generates a square wave which is locked in frequency with the incoming square wave and leads or lags the incoming wave by a phase angle which is dependent on the incoming frequency. This generated wave is applied to output lead A of phase-locked loop 102 and is represented by signal wave A in FIGS. 3A and 3B. The wave on output lead $\overline{A}$ of phase-locked loop 102 defines the inversion of signal wave A. Another output of phase-locked loop 102 is passed to flip-flop 125. As described hereinafter, this flip-flop generates at its output a square wave on lead B which lags, in phase, signal wave A by 90°. Similarly, signal wave $\overline{B}$, which is also developed by flip-flop 125, lags, in phase, signal wave $\overline{A}$ by 90°. Signal wave B is shown in FIGS. 3A and 3B.

As previously noted, gates 126 through 129 process the incoming frequency-shift signal. This is accomplished by comparing the incoming square wave with the signal waves A, $\overline{A}$, B and $\overline{B}$. The resultant outputs of gates 126 through 129 are then applied to gates 130 and 131 which, in turn, drive flip-flop 132. The output of flip-flop 132 represents the recovered baseband signal and is depicted as the output wave in FIGS.

3A and 3B. This output wave is also passed by way of lead 108 to the tone and carrier detectors in FIG. 2. The output of gate 131, which is applied to lead 109, is also passed to the tone and carrier detectors and these two waves are utilized to monitor incoming carrier or tone signals, as described in detail hereinafter.

Return now to phase-locked loop 102. A suitable arrangement for this loop is described in U.S. Pat. No. 3,449,691, which issued to G. P. Pasternack et al. on June 10, 1969. The Pasternack patent discloses a digital phase-locked loop for generating a square wave which leads or lags the phase of an incoming square wave in accordance with the incoming wave frequency. The Pasternack loop includes a digital downcounter, an EXCLUSIVE-OR circuit for comparing the phase of the incoming wave and the output of the downcounter and a transmission gate for producing pulses for driving the downcounter, the pulse rate being proportional to the average amplitude of the output signal of the EXCLUSIVE-OR circuit. As seen in FIG. 1 of the disclosure of the present invention, the incoming frequency-shift wave, which is in the form of a square wave due to limiting, is applied to one input of EXCLUSIVE-OR phase comparator 104. The other input to EXCLUSIVE-OR phase comparator 104 is provided by the output of downcount divider 103, which output also defines signal wave A. The output of EXCLUSIVE-OR phase comparator 104 is applied to transmission gate 105, which, in turn, drives downcounter 103.

As described in detail in U.S. Pat. No. 3,449,691, EXCLUSIVE-OR phase comparator 104 provides a binary signal output which is high when either (but not both) the input square-wave signal or output signal A of downcounter 103 is high. The output of EXCLUSIVE-OR circuit 104 is low when the incoming frequency-shift signal and signal wave A are both high or are both low.

The output of EXCLUSIVE-OR circuit 104 is passed to gate 119 in transmission gate 105. This output is also passed in an inverted from (due to inverter 117) to gate 118. Accordingly, NAND gate 119 is enabled when the output of EXCLUSIVE-OR circuit 104 is high and gate 118 is enabled when the output of EXCLUSIVE-OR circuit 104 is low. With the output of EXCLUSIVE-OR circuit 104 low, gate 118 is enabled and clock pulses from clock 121, having a repetition rate of $f_1$, are applied through gate 118 and gate 120 to the input of downcounter 103. With the output of EXCLUSIVE-OR circuit 104 high, clock pulses from clock 122, having a repetition rate of $f_2$, are passed through gate 119 and gate 120 to downcounter 103. The frequency of the clock pulses from clock 122, as noted hereinafter, is higher than the frequency of the clock pulses from clock 121. This has the effect of providing clock pulses to downcounter 103, the average rate being proportionate to the average amplitude of the output of EXCLUSIVE-OR circuit 104.

Downcounter 103 comprises a plurality of flip-flop stages, generally designated as 103(1) through 103(n). The signal input to each flip-flop stage is provided to its toggle input, whereby any negative transition flips the stage. Each stage output is then connected to the toggle input of the next stage to provide a conventional down-counter. The outputs of the final stage 103(*n*) are then passed to leads A and $\overline{A}$ to provide the previously described signal waves A and $\overline{A}$.

It is to be noted that the "0" output terminal of stage 103(*n*–1) is passed to the toggle input of flip-flop 125. If we presume that all the stages of the down-counter are initially preset to the CLEAR condition, and flip-flop 125 is initially preset to the SET condition, the first switching of stage 103(*n*–1) toggles flip-flop 125 to the CLEAR condition. The next switching of flip-flop 103(*n*–1) will toggle flip-flop 103(*n*) to the SET condition and the subsequent switching of flip-flop 103(*n*–1) sets flip-flop 125. Accordingly, the output wave from flip-flop 125 lags, in phase, the output wave from flip-flop 103(*n*) by 90°. The outputs of flip-flop 125 are connected to leads B and $\overline{B}$. The generation of signal waves B and $\overline{B}$ is important for the digital recovery of the baseband signal.

Refer now to FIGS. 3A and 3B. The input signal wave depicted in FIG. 3A is a spacing frequency-shift square wave, as previously noted. This spacing signal is within the fundamental "lock range" of phase-locked loop 102 and below the center frequency. Accordingly, output wave A generated by phase-locked loop 102 lags the input wave by some fixed phase angle. This output wave, which is defined by wave A in FIG. 3A, is shown to lag the phase of the input wave by approximately 45°. Signal wave B, in turn, lags, in phase, signal wave A by 90 degrees, as previously explained and thus lags the input wave by 135°. Considering these three waves in FIG. 3A, it is seen that during time interval *a* the level of the input wave is high while the levels of waves A and B are low, defining the level combination 100. Continuing on through time intervals *b* through *f*, it is seen that these level combinations are 110, 111, 011, 001 and 000. During subsequent time intervals this level combination sequence is repeated.

In FIG. 3B the input wave depicted therein is for the marking frequency, which frequency is within the lock range of the phase-locked loop and above the center frequency. In FIG. 3B, signal wave A generated by phase-locked loop 102 lags the input wave by approximately 135°. Signal wave B again lags signal wave A by 90°. Signal wave B therefore lags the input wave by 225° and, this being more than 180°, it is therefore considered that wave B leads by 135°. Considering in FIG. 3B time interval *a*, the level combinations for the input wave and signal waves A and B are 101, respectively. Subsequent level combinations during time intervals *b* through *f* are 100, 110, 010, 011 and 001. These level combinations, therefore, form the repetitive sequence when an incoming marking frequency is received.

It is to be noted that the level combinations 000 and 111 do not occur when an incoming marking frequency is received but do occur when an incoming spacing frequency is received. Accordingly, an incoming spacing frequency can be detected by performing the logic function.

$$\text{Input A, B} + \overline{\text{Input}}\ \overline{\text{A}}, \overline{\text{B}}. \quad (1)$$

Similarly, level combinations 010 and 101 occur when the incoming frequency is marking but do not occur when the incoming frequency is spacing. Thus, we can detect an incoming marking frequency by the function $$\text{Input}\ \overline{\text{A}}, \text{B} + \overline{\text{Input}}\ \text{A}, \overline{\text{B}} \quad (2)$$

These functions are performed by sets of gates comprising gates 126 through 131.

The inputs to gate 126 are connected to leads $\overline{A}$ and $\overline{B}$ and to input terminal 101 by way of inverter 112. Gate 126, therefore, detects the combination 000. The inputs to gate 127 are connected to terminal 101 and leads A and B. Gate 127, therefore, detects the level combination 111. Assuming that a spacing signal is being received, one or the other of the level combinations 000 or 111 is provided to these gates and the output of the appropriate gate goes low. This drives the output of gate 130 high. The high output of gate 130 sets flip-flop 132. With flip-flop 132 SET, its output is driven high and this high output is passed to output terminal 110, denoting a spacing baseband signal. Accordingly, whenever one or the other of level combinations 000 or 111 is detected, the output of gate 130 goes high to set flip-flop 132 (if it is not already SET), designating an incoming spacing signal. In FIGS. 3A and 3B the output of gate 130 is designated signal wave C and the output of flip-flop 132 is shown as the "output" wave.

It can be seen that when the level combination 010 is detected, gate 128 is enabled. Gate 129 is enabled when the level combination 101 is detected. If a mark is received, either gate 128 or gate 129 is enabled, the corresponding output goes low and this low signal drives the output of gate 131 high. The high output signal of gate 131 is passed to the RESET lead of flip-flop 132. Flip-flop 132 is therefore reset and its output signal, and therefore the output signal from terminal 110, goes low. This indicates that a marking signal is being received. Thus, with the marking signal being received, the output of gate 131 periodically goes high. The gate output is designated as signal wave D and is shown in FIGS 3A and 3B.

Figure 2:
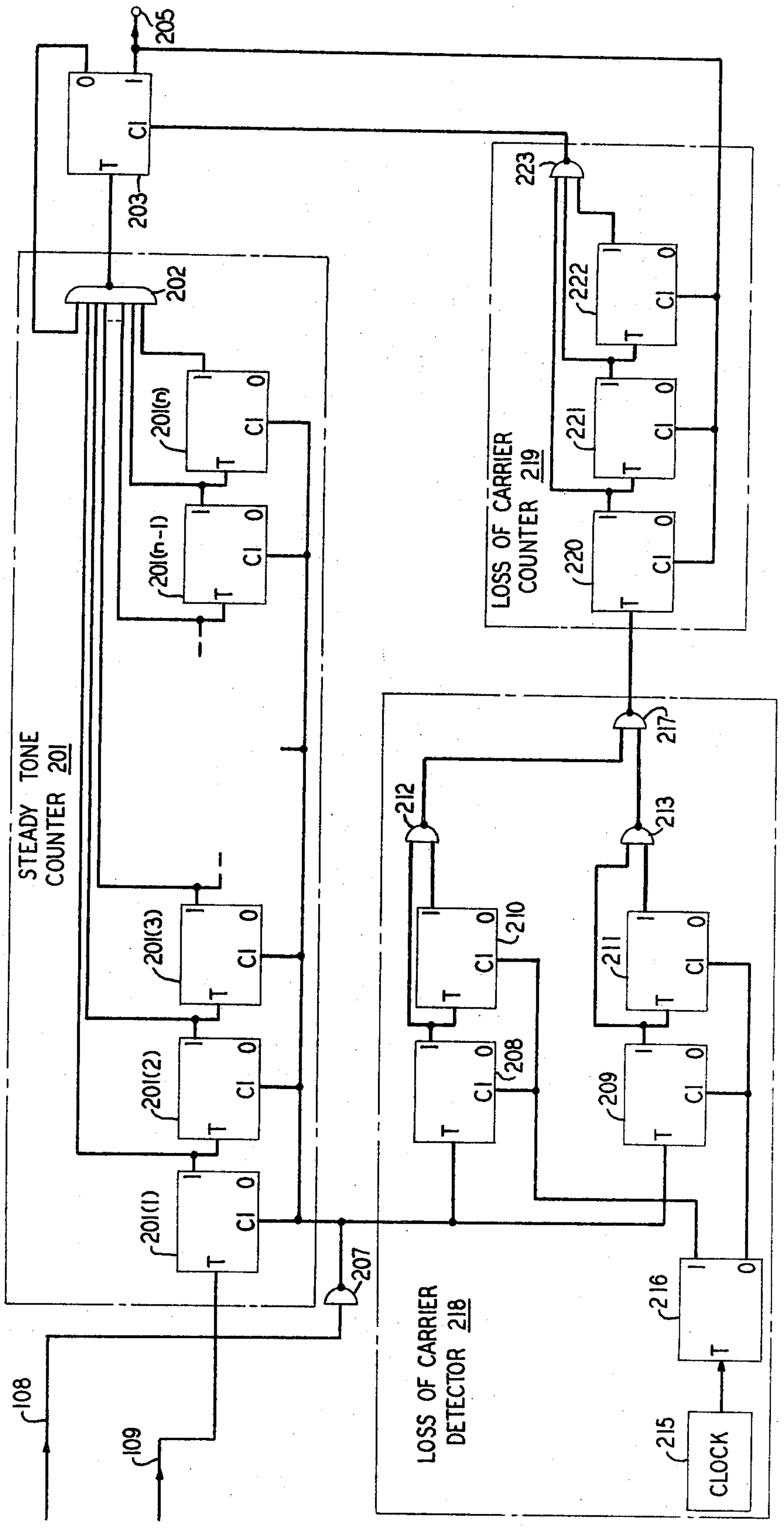

As previously noted, the steady marking tone and the presence of carrier is monitored by circuits shown in FIG. 2. The monitoring of the steady tone is provided by steady-tone counter 201 which also determines when the tone persists for a predetermined interval.

When a data call is initiated the data sets involved perform a handshaking sequence wherein each data set sends a steady marking tone for a prolonged interval. As described hereinafter, steady-tone counter 201, in response to the prolonged steady marking tone, provides a pulse to the toggle input of flip-flop 203, which is thereby driven to its SET condition. Flip-flop 203 applies to output terminal 205 a high voltage condition, indicating that steady marking tone has been received for the predetermined interval.

The incoming carrier is monitored by loss-of-carrier detector 218. The interval of the absence of carrier is determined by loss-of-carrier counter 219. In the event that the interval carrier is lost exceeds a predetermined duration, carrier counter 219 provides a clearing pulse to flip-flop 203. This resets the flip-flop to the CLEAR condition and a low potential is again applied to output terminal 205 to indicate that incoming carrier has terminated and the call is concluded. This also restores the circuit to the initial condition prior to the hand-shaking sequence.

It is recalled that when a marking tone is received the output signal on lead 108 constitutes a relatively low potential. At the same time, the signal wave D pulses are applied to lead 109. More particularly, due to the repetitive sequence of the level combinations applied to gates 128 and 129, two pulses are applied to lead 109 for each input bit interval The low potential on lead 108 is inverted by inverter 207, passing a high potential to steady-tone counter 201 and to loss-of-carrier detector 218. The pulses on lead 109 are passed to steady-tone counter 201.

Steady-tone counter 201 comprises a binary counter circuit which includes flip-flop stages 201(*l*) to 201(*n*). The outputs of the stages are then passed to gate 202. When a spacing signal is being received it is recalled that lead 108 is in the high condition. Inverter 207 therefore applies a low condition to the clear inputs of stages 201(*l*) through 201(*n*). This clamps the bistable flip-flops in the CLEAR condition. Upon the reception of the marking tone, however, the potential on lead 108 goes down and inverter 207 removes the negative clamp from the bistable flip-flops. The succeeding pulses on lead 109 now proceed to toggle flip-flop 201(*l*). The counter thereupon counts the incoming pulses until a predetermined count is achieved wherein all of the output leads presented to gate 202 are in the positive condition. As seen in FIG. 2, this is arranged to occur at the count of $2^n$ and counter 201 thereby times an interval of $2^{n-1}$ bit intervals (since two input pulses are provided for each bit interval).

Initially, it is recalled, flip-flop 203 is in the CLEAR condition. Output terminal "0" therefore passes a positive condition to gate 202. All of the inputs to gate 202 being positive, the output goes negative. This negative transition is applied to the toggle input of flip-flop 203. The flip-flop is, therefore, SET, providing to output terminal 205 the indication that a marking tone has been received for a predetermined interval. Flip-flop 203 now provides a negative potential input to gate 202, precluding further pulsing at the output of the gate. In addition, flip-flop 203 in the SET condition provides the positive signal potential to loss-of-carrier counter 219. As described hereinafter, this enables counter 219.

It is noted that, if for any reason, the output signal on lead 108 goes spacing, the resultant positive potential on the lead is inverted by inverter 207, providing a negative potential to steady-tone counter 201. This negative potential clears the count out of the counter and clamps all of the flip-flops in the CLEAR condition. A new steady marking tone will thereafter have to be reinitiated and continued for the full period in order for steady-tone counter 201 to set flip-flop 203.

The mark-to-space transitions on lead 108 are monitored by loss-of-carrier detector 218 by way of inverter 207. These transitions are monitored alternatively by two binary counters, the first counter being made up by flip-flops 208 and 210 and the second counter being made up by flip-flops 209 and 211. In accordance therewith it is noted that the transitions are applied to the toggle inputs of flip-flops 208 and 209. At the same time, the clear inputs of flip-flops 208 and 210 are connected to output terminal "1" of flip-flop 216 and the clear inputs of flip-flops 209 and 211 are connected to output terminal "0" of flip-flop 216. It is thus apparent that as the condition of flip-flop 216 switches, it alternately clears and clamps one flip-flop counter and then the other flip-flop counter.

The toggle input of flip-flop 216 is connected to the output of clock 215. The frequency of clock 215 is arranged to be higher than the maximum bit rate so that each binary counter monitors the output transitions on lead 108 for a period less than the duration of an input bit. Thus, when legitimate output transitions occur on lead 108, the maximum number of these transitions cannot exceed one before flip-flop 216 switches to clear out the unclamped counter. Accordingly, neither of the counters is permitted to count in excess of one during normal signaling conditions.

If carrier is lost, many various permutations of conditions occur on the input lead on leads A and B. This results in many transitions occurring on output lead 108 during a normal bit or monitoring interval. Assuming three mark-to-space transitions occur during any interval, these three transitions are counted by the enabled binary counter. With both of the flip-flops in the counter SET their output signals are positive, thereby enabling gate 212 or gate 213.

The outputs of gates 212 and 213 are connected to gate 217. These outputs are normally in the high condition, whereby the output of gate 217 is low. Assuming a loss of carrier, however, one or the other of gates 212 or 213 is enabled, as described above, providing a negative signal at its output. With a negative input to gate 217, its output goes positive. This positive pulse is therefore passed to loss-of-carrier counter 219.

Loss-of-carrier counter 219 comprises a three-stage binary counter involving binary flip-flops 220 to 222, together with gate 223. Prior to the handshaking sequence, flip-flops 220 to 222 are clamped to the CLEAR condition by the negative output potential provided by flip-flop 203. At the termination of the handshaking sequence flip-flop 203 is SET, as described above. Flip-flop 203 thereupon passes a relatively high potential to loss-of-carrier counter 219, removing the negative clamp and thus enabling the counter.

When the loss of carrier occurs, loss-of-carrier detector 218 passes a positive pulse to loss-of-carrier counter 219. This pulse is provided to the toggle input of flip-flop 220. At the terminal portion of the pulse flip-flop 220 is flipped to the SET condition. Thereafter each new pulse produced by carrier detector 218, in response to the absence of incoming carrier, advances the binary counter comprising flip-flops 220 to 222.

When there is a loss of carrier for seven bit intervals, all of the flip-flops in the counter are advanced to the SET condition, whereby all of their output voltages are positive. These output voltages are all provided to gate 223. Gate 223 is therefore enabled, passing a negative potential to its output. This negative potential is applied to the clear input of flip-flop 203 and restores the flip-flop to the CLEAR condition. Flip-flop 203, in turn, re-enables gate 202 and clears and clamps the binary counter in loss-of-carrier counter 219. The circuit is therefore restored to the condition prior to the hand-shaking sequence.

Although a specific embodiment of this invention has been shown and described, it will be understood that various modifications may be made without departing from the spirit of this invention.

I claim

1. A frequency discriminator for a frequency-shift signal comprising:

means for accepting the frequency shift signal means responsive to the accepting means for producing a first signal wave leading and lagging in phase in accordance with the frequency of the frequency-shift signal, means responsive to the accepting means for generating a second signal wave differing in phase from the first signal wave by a fixed angle other than 180°, and digital logic means for processing the concurrent amplitude levels of the frequency-shift signal and the first and second signal waves to recover the baseband signal.

2. A frequency discriminator in accordance with claim 1 wherein the digital logic means includes gate means for examining the concurrent amplitude levels of the frequency-shift signal and the first and second signal waves.

3. A frequency discriminator in accordance with claim 2 wherein the gate means comprise a plurality of gates, each gate having an input thereto responsive to an individual one of the frequency-shift signal and the first and second signal waves.

4. A frequency discriminator in accordance with claim 3 wherein certain of the gate inputs include means for inverting the frequency-shift signal and the first and second signal waves individual thereto.

5. A frequency discriminator in accordance with claim 3 wherein the plurality of gates define sets of gates, each set arranged to detect unique permutations of amplitude levels of the frequency-shift signal and the first and second signal waves which occur for an individual frequency of the frequency-shift signal.

6. A frequency discriminator in accordance with claim 5 wherein bistable means responsive to the sets of gates reproduces the baseband signal in the form of a binary signal.

7. A frequency discriminator in accordance with claim 5 further including means to count the output of one of the sets of gates to thereby determine the duration of the steady tone of the frequency-shift signal at the frequency individual to the one set of gates.

8. A frequency discriminator in accordance with claim 7 wherein said count means includes reset means responsive to transitions of the baseband signal to reset the count means to an initial condition.

9. A frequency discriminator in accordance with claim 6 which further includes means responsive to the bistable means for counting transitions of the baseband binary signal a fixed interval having a duration less than the bit interval of the baseband signal and including means for providing an output signal when a plurality of baseband signal transitions occur within the fixed interval to thereby indicate a loss of frequency-shift signal carrier.

10. A frequency discriminator for a frequency-shift signal comprising:

a phase-locked loop for producing a first signal wave which leads and lags the phase of the frequency-shift signal, means for producing a second signal wave differing in phase from the frequency-shift signal, the first signal wave, an inversion of the frequency-shift signal and an inversion of the first signal wave for at least one frequency of the frequency-shift signal, and digital logic means for processing the frequency-shift signal and the first and second signal waves to recover the baseband signal.

* * * * *